United States Patent
Barton et al.

(10) Patent No.: US 10,664,251 B2
(45) Date of Patent: May 26, 2020

(54) ANALYTICS DRIVEN COMPILER

(71) Applicant: International Business Machines Corporation, Armonk, NY (US)

(72) Inventors: Christopher Barton, Ontario (CA); Al Chakra, Apex, NC (US); Sumit Patel, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/153,330

(22) Filed: Oct. 5, 2018

(65) Prior Publication Data

US 2020/0110588 A1     Apr. 9, 2020

(51) Int. Cl.
*G06F 9/44* (2018.01)
*G06F 8/41* (2018.01)
*G06F 9/48* (2006.01)
*G06N 20/00* (2019.01)

(52) U.S. Cl.
CPC ............ *G06F 8/443* (2013.01); *G06F 9/4881* (2013.01); *G06N 20/00* (2019.01)

(58) Field of Classification Search
CPC ........ G06F 8/443; G06F 9/4881; G06N 20/00
USPC ........................................................ 717/152
See application file for complete search history.

(56) References Cited

U.S. PATENT DOCUMENTS

| | | | |
|---|---|---|---|
| 6,832,370 B1 * | 12/2004 | Srinivasan | G06F 8/4452 712/241 |
| 7,203,816 B2 | 4/2007 | Morimura et al. | |
| 7,367,024 B2 | 4/2008 | Barua et al. | |
| 8,863,101 B2 | 10/2014 | Gellerich et al. | |
| 9,052,913 B2 | 6/2015 | Kantamneni et al. | |
| 9,274,771 B1 | 3/2016 | Kalogeropulos et al. | |
| 9,552,193 B2 | 1/2017 | McEwan | |
| 10,360,168 B1 * | 7/2019 | Griffin | G06F 13/404 |
| 2003/0140334 A1 * | 7/2003 | Granston | G06F 8/443 717/125 |
| 2003/0237080 A1 * | 12/2003 | Thompson | G06F 8/441 717/161 |
| 2004/0003384 A1 * | 1/2004 | Pechtchanski | G06F 11/3466 717/158 |
| 2007/0050777 A1 * | 3/2007 | Hutchinson | G06F 11/0709 718/104 |

(Continued)

OTHER PUBLICATIONS

Title: Adaptie Optimization in the Jalapeno JVM, author: M Arnold et al, source: ACM Sigplan, published on 2000.*

(Continued)

*Primary Examiner* — Chameli Das

(74) *Attorney, Agent, or Firm* — Cantor Colburn LLP; Teddi Maranzano

(57) ABSTRACT

Utilizing problem insights based on the entire environment as inputs to drive a static compiler. A decision engine receives inputs associated with applications to be compiled. The decision engine also receives optimization constraints based on available resources. A decision learning model is applied to the inputs to predict compiler performance and the results are provided to the decision engine. The decision engine determines a profile that comprises an order of execution and an optimization level for use during compilation of the plurality of applications. The profile is then used to schedule compiling and optimization of the applications.

14 Claims, 4 Drawing Sheets

(56) References Cited

U.S. PATENT DOCUMENTS

| | | | |
|---|---|---|---|
| 2007/0124732 A1* | 5/2007 | Lia | G06F 9/485 718/102 |
| 2007/0294681 A1* | 12/2007 | Tuck | G06F 11/3404 717/149 |
| 2008/0127149 A1* | 5/2008 | Kosche | G06F 8/443 717/158 |
| 2009/0138682 A1* | 5/2009 | Capps, Jr. | G06F 9/30101 712/220 |
| 2010/0235819 A1 | 9/2010 | Rose | |
| 2013/0067413 A1* | 3/2013 | Boss | G06F 9/5011 715/835 |
| 2013/0305233 A1 | 11/2013 | Murphy et al. | |
| 2014/0053143 A1 | 2/2014 | Conrod et al. | |
| 2014/0136175 A1* | 5/2014 | Branson | G06F 11/34 703/13 |
| 2015/0277971 A1* | 10/2015 | Young, III | G06F 9/44521 713/100 |
| 2016/0011857 A1 | 1/2016 | Grover et al. | |
| 2016/0062878 A1* | 3/2016 | Westrelin | G06F 9/4552 717/130 |
| 2016/0171798 A1* | 6/2016 | McGinnis | G05B 19/418 701/29.3 |
| 2017/0131986 A1 | 5/2017 | Chheda et al. | |
| 2017/0161036 A1 | 6/2017 | Henry et al. | |
| 2018/0121176 A1* | 5/2018 | Cook | G06F 8/41 |
| 2018/0275976 A1* | 9/2018 | Edler Von Koch | G06F 8/443 |

OTHER PUBLICATIONS

ITilt:e: nstruction selection, resource allocation, and scheduling in the AVIV retargetable code generator, S Hanono et al, published on 1998.*

Title: Compiler optimization-space exploration, author: S Triantafyllis et al, published on 2003.*

Debbabi et al.; "E-Bunny: A Dynamic Compiler for Embedded Java Virtual Machines"; Journal of Object Technology; vol. 4, No. 1; Jan.-Feb. 2005; 26 Pages.

Gal et al.; "HotpathVM: An Effective JIT Compiler for Resource-constrained Devices"; VEE'06; Jun. 14-16, 2006; 10 Pages.

Jensen et al.; "Compiler Feedback Using Continuous Dynamic Compilation During Development"; Workshop on Dynamic Compilation Everywhere; vol. V, No. N, Article A; Jan. 2014; 12 Pages.

You et al.; "A Static Region-Based Compiler for the Dalvik Virtual Machine"; Software: Practice and Experience; Jul. 2015; 23 Pages.

* cited by examiner

ANALYTICS DRIVEN COMPILER

BACKGROUND

The invention relates generally to compilers and, more particularly, to generating a context-based compiler schedule and optimization system.

The age of data is important in compiler analytics. Most analytics engines consume or ingest real time or near-real time data. When an analytics engine flags an anomaly and the anomaly triggers an action, that action needs to happen quickly. For example, with intrusion detection, the action needs to stop any damage from occurring. Therefore, the purpose of any analytics is satisfied more easily the earlier the action occurs.

Not all data is the same when it comes to compilation and not all compilers are the same. Therefore, optimization can be based on the data type in order to influence the compiler's behavior. Moreover, rather than focus on particular analytics, how quickly the analytics come available for use is becoming more important. For example, with fraud detection, it is desirable to create the check, compile and run the code very quickly because the fraud needs to be identified as quickly as possible. Also, when performing predictive analytics, timing and efficiency are very important. Thus, real time constraints are increasingly being placed on compilers when in the past they typically were not.

SUMMARY

According to a non-limiting embodiment, a computer implemented method for driving a static compiler is provided. The method includes receiving at a decision engine inputs associated with applications to be compiled and receiving at the decision engine optimization constraints based on resources available to the compiler. The method also includes applying a decision learning model to the inputs to predict the performance of the compiler and provide results from the decision learning model to the decision engine. A profile is determined via the decision engine comprising an order of execution and an optimization level for use during compilation of the applications. The method then includes utilizing the profile to schedule compiling and optimization of the applications and compiling and optimizing one or more of the applications based on the schedule. In one or more embodiments, the method can also include training the decision learning model with historical data input to the decision engine and with corresponding historical outcomes from the decision engine. Also, the method can further include inputting the received plurality of inputs, the received plurality of constraints, and the corresponding profile into the decision learning model as historical data.

According to another non-limiting embodiment, a system for driving a compiler is provided. The system includes a decision engine receiving inputs associated with applications to be compiled and receiving optimization constraints based on resources available to the compiler. The system also includes a decision learning model applied to the inputs to predict the performance of the compiler and provide results from the decision learning model to the decision engine. A profile is generated by the decision engine wherein the profile includes an order of execution and an optimization level utilized for compilation and optimization of the applications. The system also includes a queue for queuing the applications pursuant to the order of execution indicated by the profile. In one or more embodiments, the decision learning model has been trained with historical data input to the decision engine and corresponding historical outcomes from the decision engine. Also, the received inputs, the received optimization constraints, and the corresponding profile may be input into the decision learning model as historical data.

According to yet another non-limiting embodiment, a computer program product for driving a static compiler is provided. The computer program product includes a computer readable storage medium having program instructions embodied therewith, the program instructions executable by a computer processor to cause the computer processor to perform a method. A non-limiting example of the method includes executing, via a processor, a compiler program. The method also includes receiving at a decision engine a plurality of inputs associated with a plurality of applications and receiving at the decision engine a plurality of optimization constraints based on resources available to the compiler. The method then includes applying a decision learning model to the plurality of inputs to predict the performance of the compiler and providing results from the decision learning model to the decision engine. A profile is determined via the decision engine comprising an order of execution and an optimization level for use during compilation of the applications. The method also includes utilizing the profile to schedule compiling and optimization of the applications and compiling and optimizing one or more of the applications based on the profile. In one or more embodiments the method may also further include inputting the received inputs, the received optimization constraints, and the corresponding profile into the decision learning model as historical data. The method may also include queuing the plurality of applications pursuant to the order of execution indicated by the schedule, compiling a first application first, compiling a second application second, and giving more resources for optimization of the first application than resources given to optimize the second application.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
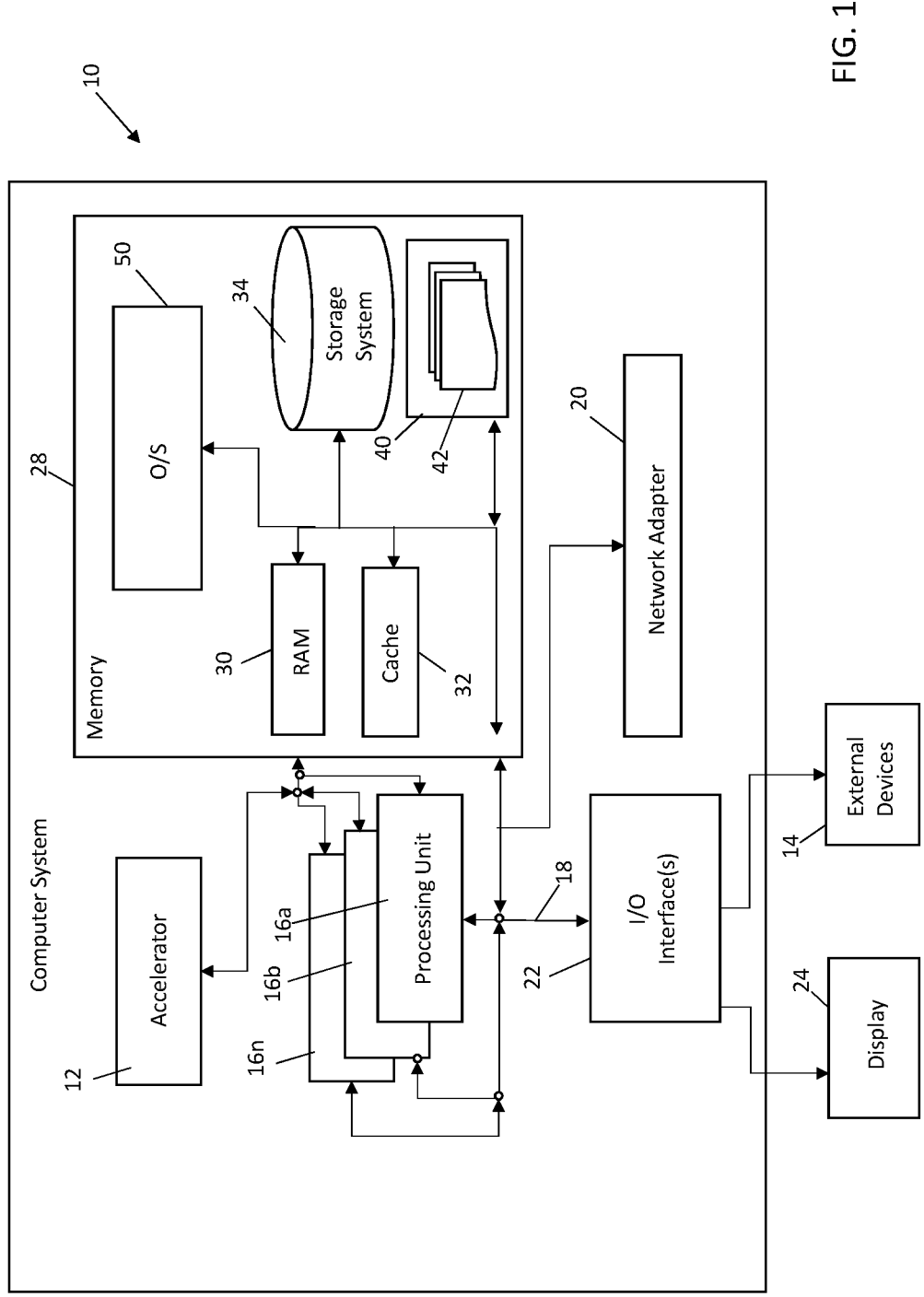
FIG. 1 is a block diagram illustrating a computer system which is capable of compiling applications in accordance with various embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, gone are the days of needing to compile a big program with millions of lines of code all at once. Today, various sized programs need to be compiled quickly. But there is an increasing number of restrictions in system resources and conditions coupled with the challenging tasks of optimizing the compiling of all the variously sized programs. Although data analytics is becoming more prevalent, optimization techniques typically merely focus on modifying the code for performance. In particular, existing systems with static compilers require a user to manually analyze and configure the static compiler based on a single application's attributes. These techniques do not view the entire environment as part of the input in order to determine optimization and compile scheduling. Moreover, compile scheduling is typically pre-determined for compiling portions of a program and are executed based on first-in-first-out or last-in-first-out schemes. As described herein, one or more embodiments address shortcomings of the prior art by providing a computer implemented method, system and a computer program product utilizing problem insights based on the entire environment as inputs and applying those inputs to a trained decision learning model for generating a prioritization schedule used for prioritizing the compiling and the optimizing of applications according to a determined order of execution and optimization level.

Referring now to FIG. 1, a computer system 10 is illustrated according to a non-limiting embodiment. In FIG. 1 the computer system 10 is shown in the form of a general-purpose computer device which also may be referred to as a processing device. The components of computer system may include, but are not limited to, the one or more accelerators 12, one or more processors or processing units 16a-16n (generally referred to herein with reference number 16), system memory 28, and a bus 18 that couples various system components.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include an operating system (OS) 50, along with computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

The OS 50 controls the execution of other computer programs and provides scheduling, input-output control, file and data management, memory management, and communication control and related services. The OS 50 can also include a library API (not shown in FIG. 1). The library API is a software library comprising APIs for performing the data manipulation functions provided by the specialized hardware devices such as, for example, the accelerator 12. The accelerator 12 is sometimes referred to as a "co-processor" and typically performs a dedicated computing function including, but not limited to, CPU processes, cryptographic operations and calculations, encoding/decoding processes, and network operations. By off-loading a particular computing function to a dedicated accelerator, the overall computing speed of the computer system can be increased.

The storage system 34 can store a basic input output system (BIOS). The BIOS is a set of essential routines that initialize and test hardware at startup, start execution of the OS 50, and support the transfer of data among the hardware devices. When the computer system 10 is in operation, the processors 16a-16n are configured to execute instructions stored within the storage system 34, to communicate data to and from the memory 28, and to generally control operations of the computer system 10 pursuant to the instructions.

Program/utility 40, having a set (at least one) of program modules 42, may be stored in memory 28 by way of example, and not limitation, as well as the OS 50, one or more application programs, other program modules, and program data. Each of the operating system, one or more application programs, other program modules, and program data or some combination thereof, may include an implementation of a networking environment. One or more program modules 42 generally define at least one program for carrying out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, data archival storage systems, etc.

Figure 2:
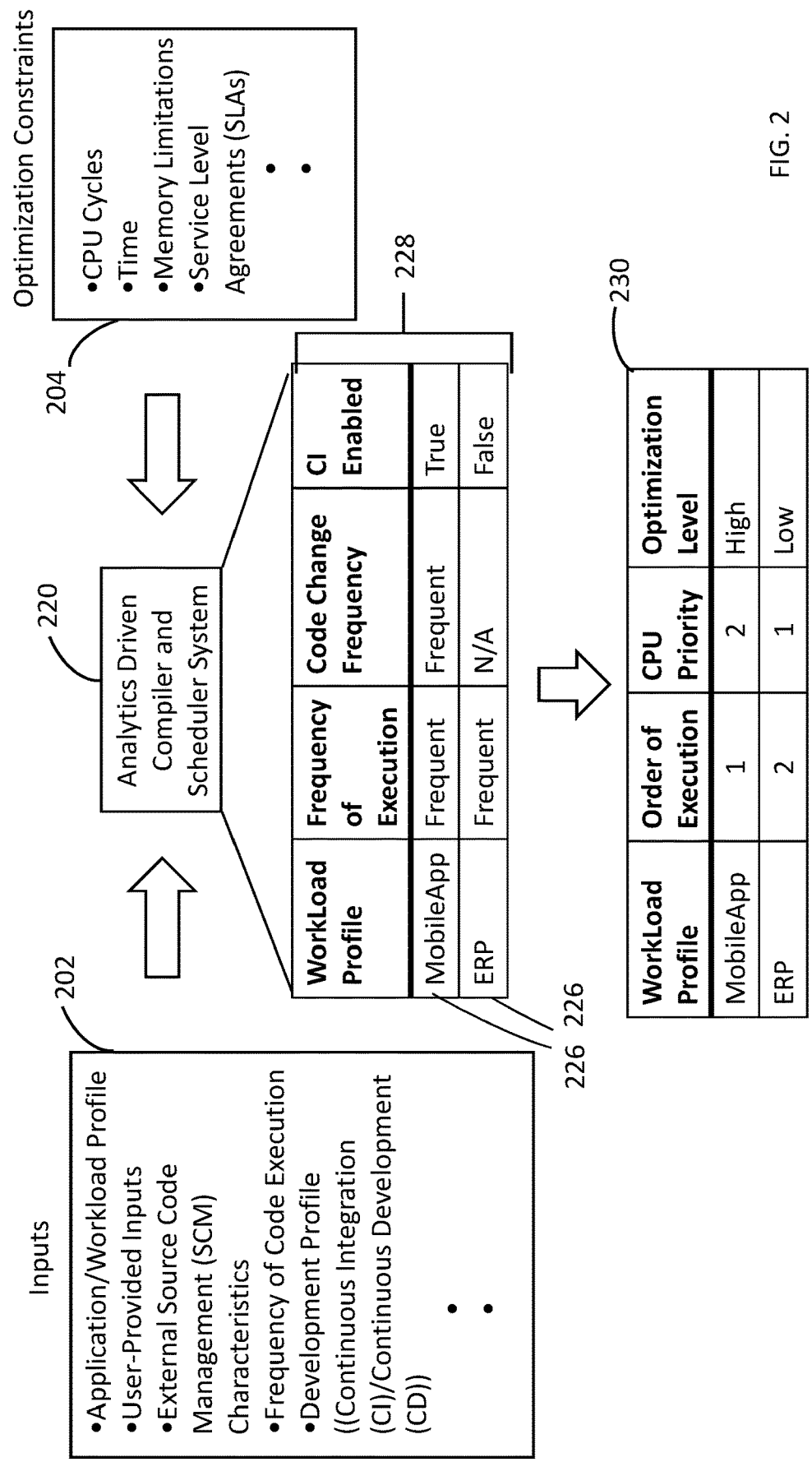
FIG. 2 is a block diagram illustrating receiving inputs and optimization constraints from the system applied against different applications and the subsequently generated schedule utilized for driving the compiler according to one or more embodiments of the present invention.

FIG. 2 is a block diagram illustrating an analytics driven complier and scheduler system 220 for receiving various inputs 202 and various optimization constraints 204. The inputs 202 can include, for example, but is not limited to, workload profiles for each application to be compiled, user-provided inputs for priority/execution, external source code management (SCM) characteristics, and frequency of code execution. The inputs 202 may also include a development profile as to whether an application involves continuous integration (CI) or continuous development (CD).

Figure 3:
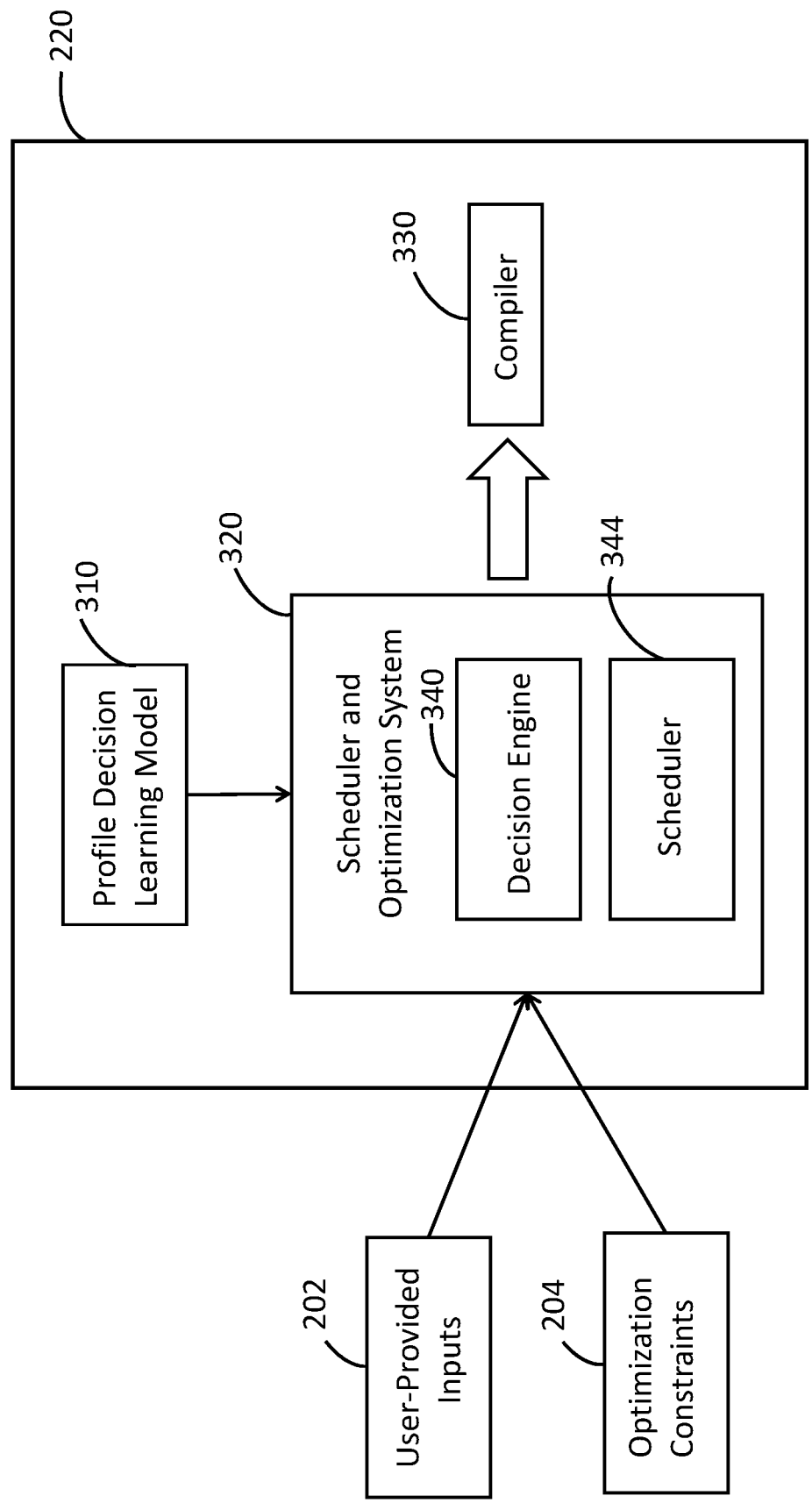
FIG. 3 is a block diagram illustrating the application of the profile decision learning model to the inputs received at a scheduler and optimization system according to one or more embodiments of the present invention.

The inputs 202 are preferably entered into a problem insights log to be received at a decision engine 340 (FIG. 3). The problem insights log is filled out as a prerequisite which creates an application profile 226 for each of the applications to be compiled as shown in the chart 228 of FIG. 2. The problem insights log is then used in combination with optimization constraints 204 for determining a profile 230 as described in greater detail below. The optimization constraints 204 on the computer system 10 can include, for example, but is not limited to, CPU cycles, time, memory limitations, and service level agreements (SLAs). As users and developers seek to compile applications, each application is queued within the analytics driven compiler and scheduler system 220.

FIG. 3 illustrates the application of the profile decision learning model 310 to the inputs 202 and optimization constraints 204 received at a scheduler and optimization system 320 according to one or more embodiments of the present invention. The profile decision learning model 310 is trained using pre-existing or known data/inputs and outcomes/results. Using analytic capabilities and techniques, the analytics driven compiler and scheduler system 220 establishes relationships between inputs and results. Once deemed accurate based on the historical data and corresponding outcomes, the profile decision learning model 310 is then applied to new inputs to determine automated outcomes/results.

The scheduler and optimization system 320 includes the decision engine 340 and a scheduler 344 for generating a compilation and optimization schedule for a compiler 330. Although FIG. 3 depicts the scheduler and optimization system 320 and the compiler 330 as being separate, part or all of the scheduler and optimization system 320 may be included with the compiler 330.

Still referring to FIG. 3, the verified profile decision learning model 310 is applied to the inputs 202 in order to predict future performance of the compiler 330. The results from the profile decision learning model 310 are provided to the decision engine 340. Based on the results from the profile decision learning model 310 and the optimization constraints 204, the decision engine 340 *t* automatically determines the profile 230. The profile 230 defines an order of execution and a CPU priority relative to each application to be compiled. The profile 230 also defines an optimization level for each application to be compiled.

For example, if a particular application is executed less often relative to another application in the same environment, less energy should be spent optimizing that particular application and it could be scheduled with the least priority. In contrast, the other application may be associated with a high number of commit changes and, therefore, the compiler would spend the most resources (i.e. time and CPU resources) to optimize the code and schedule it as soon as possible.

Referring back to FIG. 2, the profile 230 indicates that the decision engine 340 decided that the agile MobileAPP is first in order of execution but is second in priority for the CPU. Also, the Enterprise Resource Planning (ERP) application is second in the order of execution but first in priority to the CPU. The profile 230 also indicates that the MobileApp has a "High" optimization level and that the ERP application has a "Low" optimization level. The profile 230 could also indicate giving greater priority for CPU cycles to the second application than the first application.

The profile 230 is utilized by the scheduler 344 to intelligently schedule context-based compiling and optimization of the applications. As the code is uploaded, the system intelligently schedules and optimizes code based on the problem insights to ensure agile-type code is pushed out faster (perhaps with less optimization) compared to legacy system code which is heavily optimized (but may be de-prioritized). In other words, rather than just looking at an application itself, the generated schedule takes into account the criticality of the application, environmental characteristics, frequency of changes, and workload to optimize and schedule code compilation. The compiler 330 then compiles and optimizes the applications based on the profile 230. In one or more embodiments, one or more of the applications queued for the compiler 330 are manually submitted based on the schedule. Alternatively, one or more of the applications may be integrated with compiler software for compilation based on the schedule.

In one or more other embodiments, compiling and optimizing one or more of the applications based on the profile 230 could include managed queuing of the applications pursuant to the order of execution indicated by the profile 230, compiling a first particular application first, and giving more resources for optimizing the first application than resources given to optimize a second application. Then, compiling and optimizing one or more of the applications based on the profile 230 could further include compiling the second application second and giving fewer resources for optimizing the second application than the resources given to optimize the first application. In other words, the first application is queued first and given more resources for optimizing the first application than resources given to optimize the second application, based on the order of execution indicated by the schedule. In such case, the second application is queued second and given fewer resources for optimization than the resources given to optimize the first application.

Figure 4:
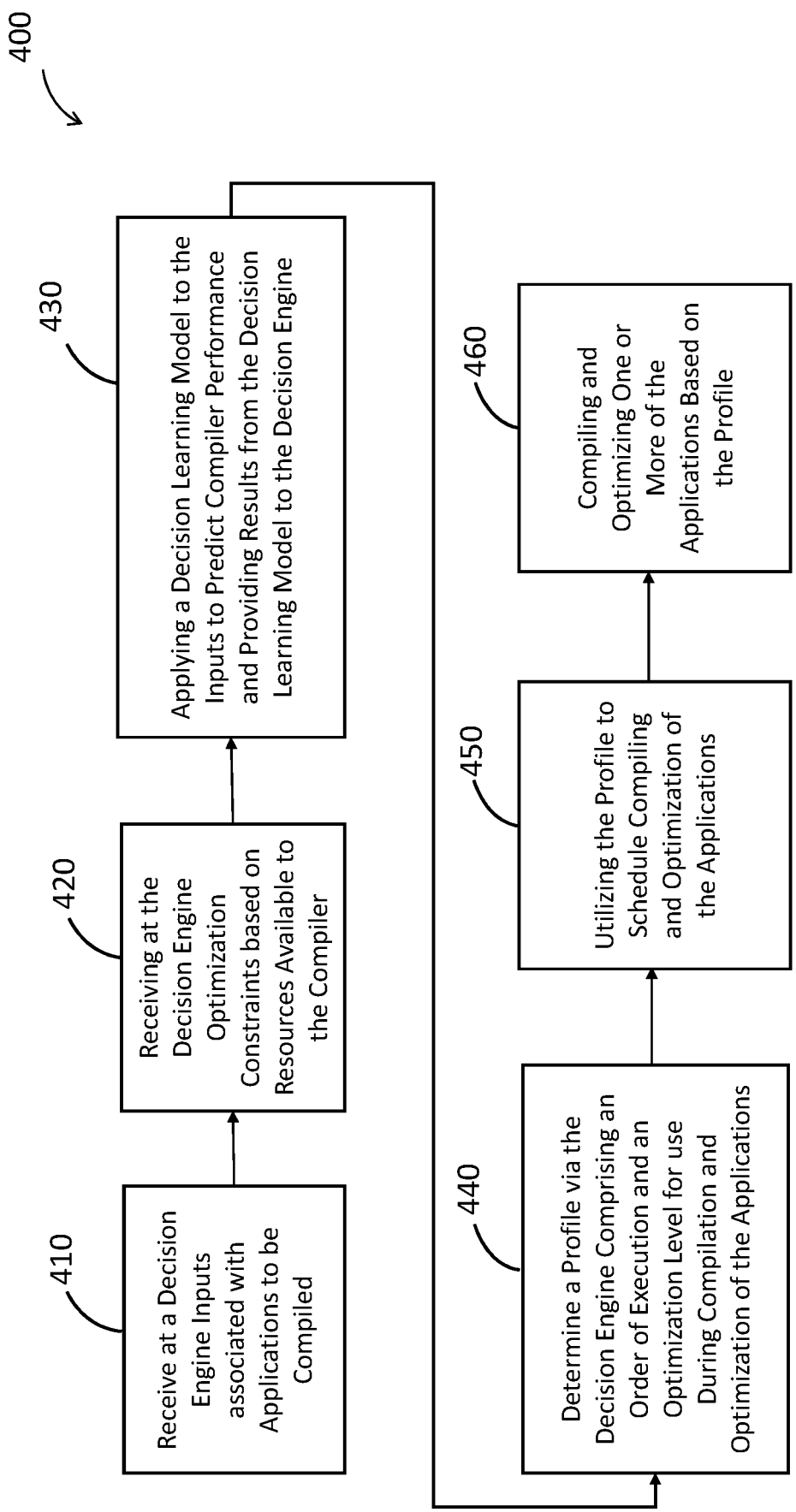
FIG. 4 is a flow diagram illustrating a method for driving a static compiler according to one or more embodiments of the present invention.

Turning now to FIG. 4, a method 400 for driving a static compiler 330 is illustrated according to a non-limiting embodiment. In order to perform the system feature, the method 400 includes process block 410 for receiving at the decision engine 340 a plurality of inputs 202 associated with applications to be compiled. The received inputs 202 may be used to create a problem insights log for each of the applications. The method 400 also includes process block 420 for receiving at the decision engine 340 a plurality of optimization constraints 204 based on resources available to the compiler 330. Process block 430 includes applying the decision learning model 310 to the inputs 202 to predict the performance of the compiler 330 and providing results from the decision learning model 310 to the decision engine 340. Process block 440 then includes determining a profile 230 via the decision engine 340 comprising an order of execution and an optimization level for use during compilation of the applications. The method 400 also includes process block 450 for utilizing the profile 230 to schedule compiling and optimization of the applications and process block 460 for compiling and optimizing one or more of the applications based on the profile 230.

The method 400 may also include one or more other process blocks. In one or more embodiments, the method 400 can include training the decision learning model 310 with historical data that had been input to the decision engine 340 and corresponding historical outcomes or results from the decision engine 340. The method 400 may also include inputting the new received inputs 202, the received optimization constraints 204, and the profile 230 into the decision learning model 310 as historical data.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for driving a static compiler, comprising:
   receiving, at a decision engine, a plurality of inputs associated with a plurality of applications;
   receiving, at the decision engine, a plurality of optimization constraints based on resources available to the compiler;
   applying a decision learning model trained with historical data input and corresponding historical outcomes to the plurality of inputs to predict performance of the compiler and providing results from the decision learning model to the decision engine;
   determining a profile via the decision engine comprising an order of execution and an optimization level for use during compilation of the plurality of applications;
   utilizing the profile to schedule compiling and optimization of the plurality of applications; and
   compiling and optimizing one or more of the plurality of applications based on the profile by queuing the plurality of applications pursuant to the order of execution indicated by the profile, compiling a first application of the plurality of applications first, and giving more resources for optimizing the first application than resources given to optimize a second application of the plurality of applications.

2. The computer implemented method of claim 1 wherein compiling one or more of the plurality of applications comprises manually submitting at least one of the plurality of applications for compilation based on the profile.

3. The computer implemented method of claim 1 wherein compiling one or more of the plurality of applications comprises integrating at least one of the plurality of applications with compiler software for compilation based on the profile.

4. The computer implemented method of claim 1 further comprising inputting the plurality of inputs, the plurality of optimization constraints, and the profile into the decision learning model as historical data.

5. The computer implemented method of claim 1 wherein receiving at the decision engine the plurality of inputs comprises creating a problem insights log for each of the plurality of applications.

6. The computer implemented method of claim 1 wherein compiling and optimizing one or more of the plurality of applications based on the profile comprises compiling the second application of the plurality of applications second and giving less resources for optimizing the second application than the resources given to optimize the first application.

7. The computer implemented method of claim 1 further comprising giving greater priority for central processing unit (CPU) cycles to the second application than the first application.

8. A system for driving a compiler, the system comprising:
   a decision engine receiving a plurality of inputs associated with a plurality of applications and a plurality of optimization constraints based on resources available to the compiler, the decision engine trained with historical data input to the decision engine and corresponding historical outcomes from the decision engine;

a decision learning model applied to the plurality of inputs to predict performance of the compiler and provide results from the decision learning model to the decision engine;

a profile generated by the decision engine wherein the profile comprises an order of execution and an optimization level utilized for compilation and optimization of the plurality of applications; and a queue for queuing the plurality of applications pursuant to the order of execution indicated by the profile, wherein a first application of the plurality of applications is queued first and given more resources for optimizing the first application than resources given to optimize a second application of the plurality of applications, based on the order of execution indicated by the profile.

9. The system of claim 8 wherein the plurality of inputs, the plurality of optimization constraints, and the profile corresponding with the plurality of inputs and the plurality of optimization constraints are input into the decision learning model as historical data.

10. The system of claim 8 wherein a problem insights log is generated from the plurality of inputs.

11. The system of claim 8 wherein the second application of the plurality of applications is queued second and given less resources for optimization than the resources given to optimize the first application.

12. A computer program product comprising a computer readable storage medium having program instructions embodied therewith, the program instructions executable by a computer processor to cause the computer processor to perform a method, comprising:

executing, via the computer processor, a compiler program;

receiving, at a decision engine, a plurality of inputs associated with a plurality of applications;

receiving, at the decision engine, a plurality of optimization constraints based on resources available to the compiler program;

applying a decision learning model to the plurality of inputs to predict performance of the compiler program and providing results from the decision learning model to the decision engine;

determining a profile via the decision engine comprising an order of execution and an optimization level for use during compilation of the plurality of applications;

utilizing the profile to define a schedule compiling and optimization of the plurality of applications;

compiling and optimizing one or more of the plurality of applications based on the schedule by queuing the plurality of applications pursuant to the order of execution indicated by the schedule, compiling a first application first, compiling a second application second, and giving more resources for optimization of the first application than resources given to optimize the second application; and training the decision learning model with historical data input to the decision engine and corresponding historical outcomes from the decision engine.

13. The computer program product of claim 12 wherein compiling one or more of the plurality of applications comprises manually submitting at least one of the plurality of applications for compilation based on the schedule.

14. The computer program product of claim 12 further comprising inputting the plurality of inputs, the plurality of optimization constraints, and the profile corresponding with the plurality of inputs and the plurality of optimization constraints into the decision learning model as historical data.

* * * * *